US009823668B2

(12) United States Patent
Pechtold et al.

(10) Patent No.: US 9,823,668 B2
(45) Date of Patent: *Nov. 21, 2017

(54) PRESSURE REGULATOR FOR HYDROGEN STORAGE SYSTEM

(71) Applicant: GM Global Technology Operations LLC, Detroit, MI (US)

(72) Inventors: Rainer Pechtold, Hunstetten (DE); Dimitri A. Podorashi, Weiterstadt (DE); Hans Weidner, Darmstadt (DE); Wolfgang Markard, Florsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/730,312

(22) Filed: Jun. 4, 2015

(65) Prior Publication Data

US 2015/0268672 A1    Sep. 24, 2015

Related U.S. Application Data

(63) Continuation of application No. 12/259,454, filed on Oct. 28, 2008, now Pat. No. 9,074,703.

(51) Int. Cl.
*G05D 16/04*    (2006.01)
*F16K 17/30*    (2006.01)
(Continued)

(52) U.S. Cl.
CPC .............. *G05D 16/04* (2013.01); *F16K 17/30* (2013.01); *F16K 31/1221* (2013.01);
(Continued)

(58) Field of Classification Search
CPC .. G05D 16/04; G05D 16/103; F16K 31/1223; F16K 17/30; F16K 31/1221; Y02E 60/321
(Continued)

(56) References Cited

U.S. PATENT DOCUMENTS 2,002,450 A * 5/1935 George ................... F01B 25/00
251/63
2,615,287 A * 10/1952 Senesky ............. G05D 16/0663
137/505.42

(Continued)

FOREIGN PATENT DOCUMENTS

FR    2879721 A1    6/2006
WO    2005124493 A1    12/2005

*Primary Examiner* — Chee-Chong Lee
(74) *Attorney, Agent, or Firm* — Quinn IP Law

(57) ABSTRACT

A pressure regulator for a hydrogen storage system, wherein the pressure regulator is adapted to operate at temperatures below −50° C., while minimizing the need for separate sealing elements and O-rings. The pressure regulator includes a main body including an inner cavity bounded by an interior wall, a piston disposed in the inner cavity, the piston including a first channel disposed adjacent a first portion, wherein the first portion is adapted to cooperate with the interior wall to form a seal between the piston and the interior wall, a first biasing device disposed in the first channel, wherein the first biasing device is adapted to exert a force on the first portion of the piston to form a seal between the first portion and the interior wall, and an end cap coupled to the main body thereby enclosing the piston to form an outlet pressure chamber.

20 Claims, 3 Drawing Sheets

(51) Int. Cl.
*F16K 31/122* (2006.01)
*G05D 16/10* (2006.01)

(52) U.S. Cl.
CPC ...... *F16K 31/1223* (2013.01); *F16K 31/1226* (2013.01); *G05D 16/103* (2013.01); *Y10T 137/7793* (2015.04)

(58) Field of Classification Search
USPC .................................................... 137/505.25
See application file for complete search history.

(56) References Cited

U.S. PATENT DOCUMENTS

| | | | |
|---|---|---|---|
| 3,698,425 A | | 10/1972 | Fisher |
| 3,926,208 A | * | 12/1975 | Hoffman ................ F16K 17/34 137/116.5 |
| 4,009,645 A | | 3/1977 | Freimuth |
| 4,194,522 A | * | 3/1980 | Lucas .................. G05D 16/103 137/116.5 |
| 5,135,023 A | * | 8/1992 | Ross ..................... F17C 13/025 137/505.11 |
| 5,656,034 A | | 8/1997 | Kochersperger et al. |
| 6,056,006 A | | 5/2000 | Hagerty |
| 6,186,168 B1 | * | 2/2001 | Schultz ................ G05D 16/103 137/505.11 |
| 6,321,779 B1 | | 11/2001 | Miller et al. |
| 6,851,447 B1 | * | 2/2005 | Carroll ................ G05D 16/103 137/505.25 |
| 7,341,074 B2 | | 3/2008 | Pechtold |
| 2004/0007269 A1 | | 1/2004 | Larsen |
| 2006/0225795 A1 | | 10/2006 | Baker |
| 2006/0231142 A1 | | 10/2006 | Schwartz |
| 2008/0011361 A1 | | 1/2008 | Larsen et al. |

* cited by examiner

PRESSURE REGULATOR FOR HYDROGEN STORAGE SYSTEM

CROSS-REFERENCE TO RELATED APPLICATION

This application is a continuation application of and claims the benefit of priority of U.S. patent application Ser. No. 12/259,454 filed on Oct. 28, 2008, hereby incorporated herein by reference in its entirety.

FIELD OF THE INVENTION

The present invention relates to pressure regulators. More particularly, the invention is directed to a pressure regulator for a hydrogen storage system.

BACKGROUND OF THE INVENTION

Hydrogen in storage systems is typically held at pressures ranging from 20 to 875 bar. However, hydrogen is delivered to a user, e.g. a fuel cell, at lower pressures in the range of 6 to 10 bar, for example. In order to efficiently deliver the hydrogen to the user at a desired pressure, a pressure regulator is needed. Accordingly, there are multiple pressure regulators that may be used. Where the pressure regulator includes a piston for sensing and regulating pressure, seals are required. In certain applications, such as fuel cell systems for example, seals are required to withstand temperature variations in a range of −80° C. and +85° C.

U.S. Pat. App. Pub. No. 2008/0011361 to Larson discloses a pressure regulator including O-ring seals formed from an elastomer. As described in Larson, an elastomer such as ethylene propylene rubber (EPDM) may be suitable for temperatures approaching −50° C. However, the temperature of the hydrogen travelling from a hydrogen storage system to a fuel cell can decrease to values as low as −80° C. Because of the lower temperatures, O-ring seals made of an elastomer are no longer effective.

It is well known to a person skilled in the art of pressure regulators that a seal may also be formed from a silicon material for application in low temperature environments. However, silicon is not an appropriate sealing material for use with hydrogen, as silicon does not have a desirable permeability and is pourous to hydrogen.

It would be desirable to have a pressure regulator for a hydrogen storage system, wherein the pressure regulator is adapted to efficiently operate at temperatures below −50° C., while minimizing the need for separate sealing elements and O-rings.

SUMMARY OF THE INVENTION

Concordant and consistent with the present invention, a pressure regulator for a hydrogen storage system, wherein the pressure regulator is adapted to efficiently operate at temperatures below −50° C., while minimizing the need for separate sealing elements and O-rings, has surprisingly been discovered.

In one embodiment, a piston assembly for a pressure regulator comprises a piston having a first portion and a first biasing device adapted to cooperate with the piston and exert a force on the first portion of the piston to form a seal between the first portion and the pressure regulator.

In another embodiment, a pressure regulator comprises: a main body; a piston having a first portion adapted to cooperate with the main body to form a seal between the piston and the main body; and a first biasing device adapted to exert a force on the first portion of the piston to form the seal between the first portion and the main body.

In another embodiment, a pressure regulator comprises: a main body including an inner cavity bounded by an interior wall; a piston disposed in the inner cavity, the piston including a first channel disposed adjacent a first portion, wherein the first portion is adapted to cooperate with the interior wall to form a seal between the piston and the interior wall; a first biasing device disposed in the first channel, wherein the first biasing device is adapted to exert a force on the first portion of the piston to form the seal between the first portion and the interior wall; and an end cap coupled to the main body thereby enclosing the piston to form an outlet pressure chamber.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
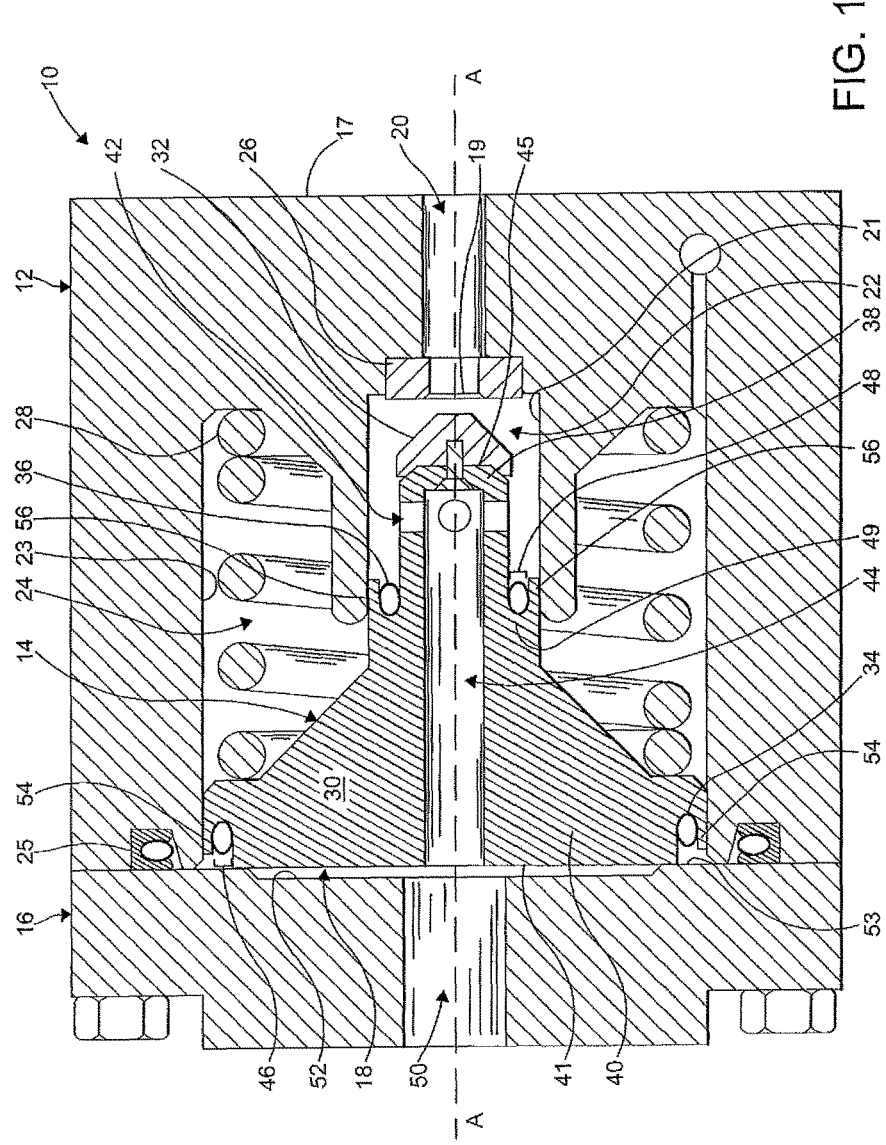
FIG. 1 is a sectional view of a pressure regulator according to an embodiment of the present invention showing the pressure regulator fully opened.
Figure 2:
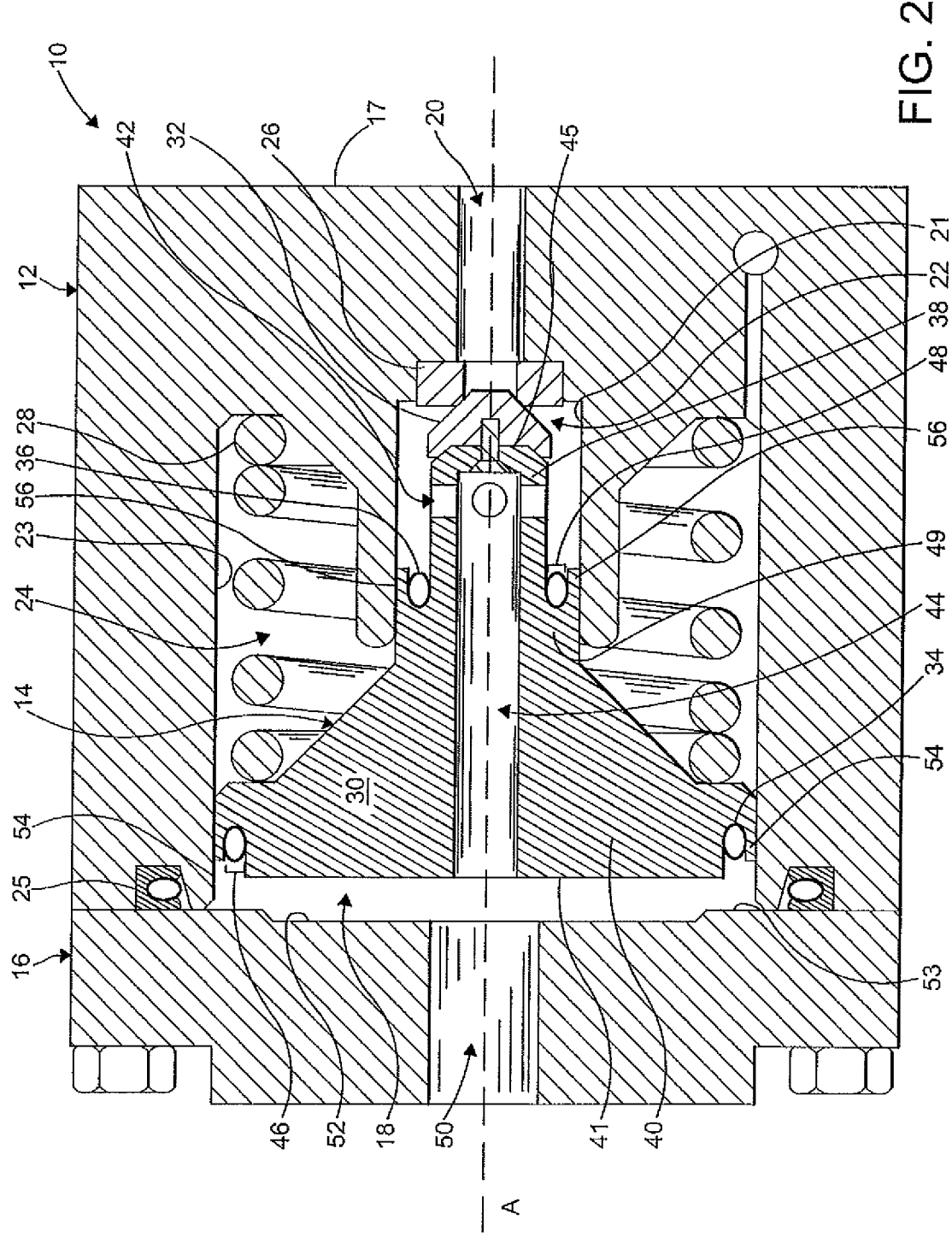
FIG. 2 is a sectional view of the pressure regulator of FIG. 1 showing the pressure regulator fully closed.

FIGS. 1 and 2 show a pressure regulator 10 for a gas dispensing system (not shown) according to an embodiment of the present invention. As shown, the pressure regulator 10 includes a substantially unitary main body 12, an interior piston assembly 14 disposed within the main body 12, and an end cap 16 coupled to the main body 12, thereby enclosing the piston assembly 14 to form an outlet pressure chamber 18 for pressure control. In FIG. 1 the pressure regulator 10 is shown in a fully opened position. In FIG. 2, the pressure regulator 10 is shown in a fully closed position. Although FIGS. 1 and 2 illustrate an in-line pressure regulator 10, the invention can be applied to other piston-based pressure regulators such as side flow, pressure equalization, and moving seat pressure regulators, for example.

The main body 12 includes an inlet port 20, an inlet pressure chamber 22, and an inner cavity 24. It is understood that the main body 12 may include additional elements formed in or disposed on a first end 17 of the main body for connecting the pressure regulator 10 to a gas dispensing system or tank (not shown). The main body 12 includes a sealing element 25 for providing a pressure seal between the main body 12 and the end cap 16. As a non-limiting example, the sealing element 25 may be a spring energized radial seal 100, shown in FIG. 3a. Other seals may be used, as desired.

The inlet port 20 is formed in the first end 17 of the main body 12 to provide fluid communication between the gas dispensing system and the inlet pressure chamber 22. As shown, the inlet port 20 has a longitudinal axis A. It is understood that the inlet port 20 may have any shape and size, as desired. It is further understood that the inlet port 20 may include a plurality of channels or chambers for controlling pressure and directing fluid to the inlet pressure chamber. As shown, a seat ring 26 is disposed adjacent a first end 19 of the inlet port 20 where the inlet port 20 meets the inlet pressure chamber 22. The seat ring 26 includes a chamfered edge and cooperates with the piston assembly 14 to form a seal to control the flow rate of fluid between the inlet port 20 and the inlet pressure chamber 22. It is understood that the seat ring 26 may be formed in the main body 12. As a non-limiting example, the first end 19 of the inlet port 20 may include a chamfered edge adapted to cooperate with the piston assembly 14 to form a seal without a separate seat ring 26.

The inlet pressure chamber 22 is bounded by an inlet wall 21 formed in the main body 12, wherein the inlet pressure chamber 22 is in fluid communication with the inlet port 20. As shown, the inlet pressure chamber 22 is cylindrical and substantially concentric with the longitudinal axis A of the inlet port 20. It is understood that the inlet pressure chamber 22 may have any size and shape, as desired. The inlet pressure chamber 22 is adapted to receive at least a portion of the piston assembly 14 for controlling the pressure of the inlet pressure chamber 22 and the fluid flow rate between the inlet port 20 and inlet pressure chamber 22. As shown, the piston assembly 14 sealingly isolates the inlet pressure chamber 22 from the inner cavity 24.

The inner cavity 24 is bounded by an interior wall 23 of the main body 12. As shown, the inner cavity 24 is substantially concentric with the longitudinal axis A of the inlet port 20. It is understood that the inner cavity 24 may have any size and shape, as desired. The inner cavity 24 is adapted to receive at least a portion of the piston assembly 14. The inner cavity 24 also retains a loading element 28 for biasing the piston assembly 14 in a desired direction. As a non-limiting example, the loading element 28 is a spring having a desired size and spring constant. Other suitable loading elements or biasing elements may be used, as desired. As shown, the inner cavity 24 is isolated from the inlet pressure chamber 22 and the outlet pressure chamber 18 to effectively control the flow of fluid through the pressure regulator 10 in a desirable manner.

The piston assembly 14 includes a piston 30, a piston seat 32, a first biasing device 34, and a second biasing device 36. It is understood that any number of biasing devices 34 may be included, as desired. The biasing devices 34, 36 may be any biasing device or element such as a spring, a flexible metal form, and a tubular metal formation, for example. As a non-limiting example, the biasing devices 34, 36 may have a shape similar to any of a plurality of biasing elements 102, 202, 302 of the radial seals 100, 100', 100" shown in FIGS. 3a, 3b, and 3c. The piston assembly 14 may also include additional components and features, as desired. It is further understood that the piston assembly 14 may be any shape and size, as desired. As shown, the piston assembly 14 is adapted to cooperate with the loading element 28 to control the flow of fluid from the inlet port 20.

The piston 30 is formed from ultra high molecular weight polyethylene (UHMW-PE). However, it is understood that the piston 30 may be formed from any material having a desirable permeability and low-temperature performance such as polytetrafluoroethylene (PTFE), for example. It is further understood that the piston 30 may be formed by any suitable manufacturing process, such as injection molding, for example. Other manufacturing methods may be used, as desired. The piston 30 includes a generally cylindrical piston base 38 substantially concentrically aligned with a piston head 40. As shown, the piston head 40 has a substantially circular outlet face 41. Other shapes may be used, as desired. As further illustrated, the piston head 40 has a generally triangular cross sectional shape and the piston base 38 has a generally rectangular cross-sectional shape. However, the piston 30 may be formed into other shapes, as appropriate. To direct hydrogen from the inlet pressure chamber 22 to the outlet pressure chamber 18 for pressure control, the piston 30 includes at least one cross-bore 42 within the piston base 38 that provides fluid communication between the hydrogen from the storage supply through at least one axial bore 44 within the piston 30 to the outlet pressure chamber 18. It is understood that the piston 30 may include any number of cross bores 42 and axial bores 44, as desired. It is further understood that the at least one cross-bore 42 and the at least one axial bore 44 may have any shape or size, as desired.

The piston seat 32 is coupled to a first end 45 of the piston base 38. As shown, the piston seat 32 is substantially concentrically aligned with the longitudinal axis A of the inlet port 20. It is understood that any appropriate coupling means may be used to couple the piston seat 32 and the piston base 38. The piston seat 32 is formed from a material desirable for cooperating with the seat ring 26 to form a seal for controlling the flow rate of fluid between the inlet port 20 and the inlet pressure chamber 22.

The piston 30 further incorporates a first annular channel 46 formed adjacent the outlet face 41 of the piston head 40 and a second annular channel 48 formed adjacent a central portion 49 of the piston base 38. The first and second channels 46, 48 may have any shape and size, and are adapted to receive the first biasing device 34 and the second biasing device 36 therein. It is understood that any number of channels may be formed in the piston 30, as desired. In certain embodiments, the first channel 46 is adapted to receive the first biasing device 34 and the second channel 48 is adapted to receive the second biasing device 36. Other means for integrating the biasing devices 34, 36 with the piston 30 may be used, as desired. As shown in FIGS. 1 and 2, the first biasing device 34 is disposed in the first channel 46 of the piston 30 and the second biasing device 36 is disposed in the second channel 48 of the piston 30. As such, the biasing devices 34, 36 each cooperate with the piston 30 to provide a pressure seal with the main body 12, thereby minimizing the need for separate sealing elements and O-rings. It is understood that other means for integrating the biasing devices 34, 36 with the piston 30 may be used, as desired.

The end cap 16 is coupled to the main body 12, thereby enclosing the piston assembly 14 to form the outlet pressure chamber 18. The end cap 16 may be coupled to the main body 12 using any appropriate means. As a non-limiting example, the end cap 16 is shown coupled to the main body 12 using threaded bolts. Other coupling devices may be used, as desired. In the embodiment shown, the end cap 16 includes an outlet port 50 for providing fluid communication between the outlet pressure chamber 18 and a user such as a fuel cell system. The outlet port 50 is formed in the end cap 16 along the longitudinal axis A and is substantially concentric with the inlet port 20. It is understood that the outlet port 50 may have any shape and size, as desired. It is further understood that the outlet port 50 may include a plurality of channels or chambers for controlling pressure and directing fluid to the user. As shown, the end cap 16 further includes a recess 52 formed in an inner surface 53 of the end cap 16. It is understood that the recess 52 of the end cap 16 may have any size and shape, as desired. As such, the recess 52 provides an enhanced pressure control of the outlet pressure of the pressure regulator 10. Specifically, the outlet pressure is controlled and regulated by the interaction of a pressurized fluid on the recess 52 of the end cap 16 and the outlet face 41 of the piston head 40. Enhanced pressure control may be achieved by modifying the outlet face 41 of the piston head 40 and the recess 52 of the end cap 16. Similar enhanced pressure control is described in U.S. Pat. App. Pub. No. 2008/0011361 to Larson.

Figures 3A, 3B:
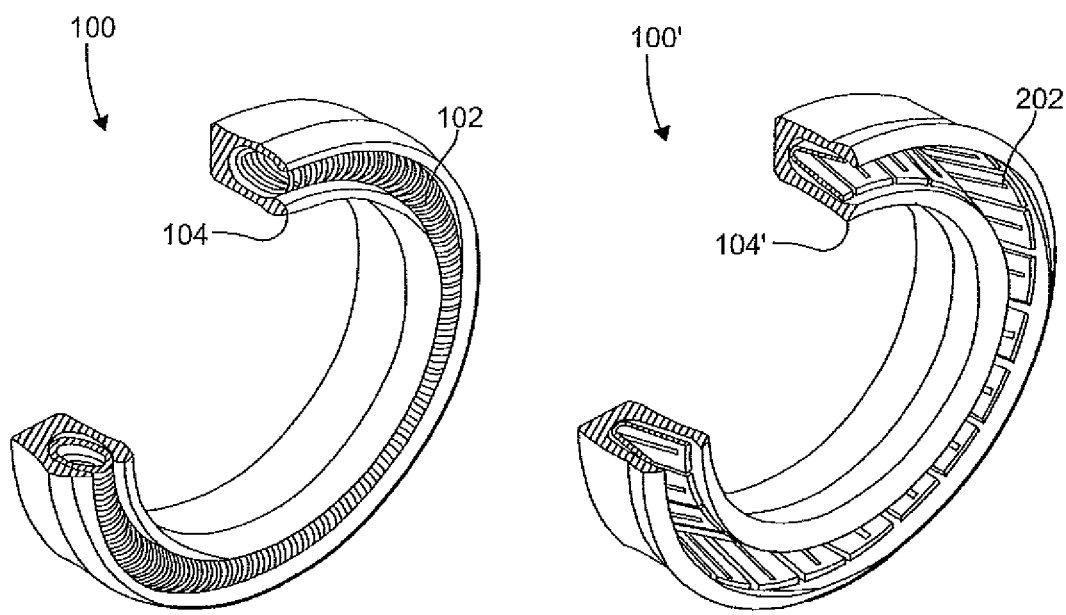
FIG. 3a is a perspective view of a radial seal according to one embodiment of the present invention showing a portion of the radial seal in section.
FIG. 3b is a perspective view of a radial seal according to another embodiment of the present invention showing a portion of the radial seal in section.
Figure 3C:
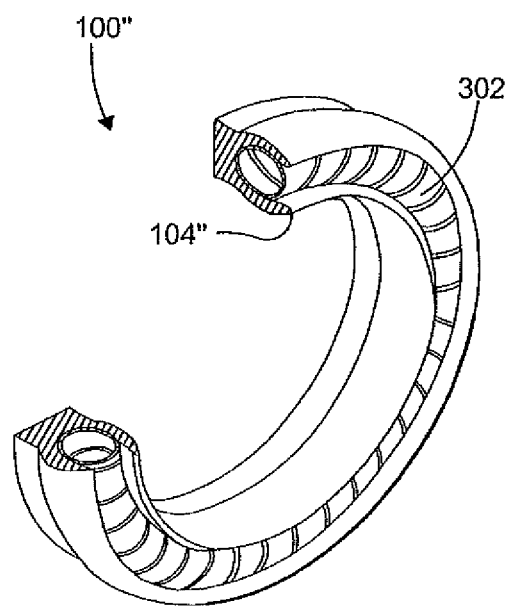
FIG. 3c is a perspective view of a radial seal according to yet another embodiment of the present invention showing a portion of the radial seal in section.

FIG. 3a illustrates the spring energized radial seal 100 including a radial biasing element 102 partially encased by a radial sealing material 104. As a non-limiting example, the radial biasing element 102 is a spring and the sealing material 104 is UHMW-PE. However, it is understood that other materials having desirable characteristics may be used as the sealing material 104. It is further understood that other biasing elements may be used as an alternative to the spring. For example, FIG. 3b illustrates a radial seal 100' wherein the radial biasing element 202 is a metal formation having a V' shape. Structure repeated from the description of FIG. 3a includes the same reference numeral and a prime (') symbol. As another example, FIG. 3c shows a radial seal 100" wherein the radial biasing element 302 is a tubular metal form. Structure repeated from the description of FIGS. 3a and 3b includes the same reference numeral and a double prime (") symbol. It is understood that the radial biasing elements 102, 202, 302 may have any shape and size as desired. It is understood that other sealing elements 104, 104', 104" may be used, as appropriate.

In use, the loading element 28 biases the piston 30 in a direction away from the seat ring 32, and into contact with the inner surface 53 of the end cap 16 to permit substantially unrestricted fluid flow from the inlet port 20 to the outlet port 50. Specifically, the fluid flows from the inlet pressure chamber 22, through the at least one cross-bore 42 and the at least one axial bore 44, and momentarily pressurizes the outlet pressure chamber 18 to a pressure above a predetermined outlet pressure. It is understood that the predetermined pressure in the outlet pressure chamber 18 may be dependent upon the system in communication with the outlet port 50. If the pressure in the outlet pressure chamber 18 increases, an increasing force is exerted upon the recess 52 of the end cap 16 and the output face 41 of the piston head 40. When the pressure regulator 10 is in the fully closed position, the magnitude of the force is related to a surface area of the recess 52 of the end cap 16 and the output face 41 of the piston head 40. The force caused by the pressure in the outlet pressure chamber 18 opposes the loading force of the loading element 28. When the force caused by the pressure in the outlet pressure chamber 18 exceeds the loading force of the loading element 28 the piston 30 is caused to move towards the seat ring 26 exposing a portion of the inner surface 53 of the end cap 16 to the outlet pressure. As such, the pressure in the outlet pressure chamber 18 acts upon the entire recess 52 of the end cap 16, the entire output face 41 of the piston head 40, and the exposed portion of the inner surface 53 of the end cap 16, to overcome the loading force of the loading element 28. The increased surface area provides enhanced pressure control by providing greater feedback force resulting from the increased exposed surface of the inner surface 53 of the end cap 16. When the pressure in the outlet pressure chamber 18 is substantially equal to a desired operating pressure or set point, as determined by the force balance, the piston seat 32 fully engages the seat ring 26 to substantially militate against fluid flow through the pressure regulator 10.

To selectively control fluid flow from the inlet port 20, the piston seat 32 and the seat ring 26 cooperate to provide a variable restriction at the first end 19 of the inlet port 20 to control fluid pressure within the pressure regulator 10. Specifically, to seal or close the first end 19 of the inlet port 20 during pressure control, the piston seat 32 is shaped to sealingly engage the chamfered edge of the seat ring 26. It should be appreciated by one of ordinary skill in the art that the restriction presented by the cooperation of the piston seat 32 and the seat ring 26 creates a pressure reduction within the regulator 10. That is, the regulated outlet pressure of the pressure regulator 10 is controlled by a force balance acting on the piston 30. As would be known using known engineering principles, the piston 30 experiences a first force due to the fluid pressure from the inlet port 20 acting on the piston seat 32 area and by the force of the loading element 28. The piston 30 experiences a second force opposing the first force due to fluid pressure from the outlet pressure chamber 18 acting on the outlet face 41 of the piston 30.

It should be further appreciated by one of ordinary skill in the art that during operation, the piston 30 is continuously cycled towards and away from the piston seat 32 to maintain pressure control in response to variations in outlet pressures. Throughout the continuous motion cycle of the piston 30, radial outward force of the first biasing device 34 secures the first biasing device 34 in the first channel 34 while simultaneously exerting a force on the walls of the first channel 46. As a result, a first portion 54 of the piston 30 adjacent the first channel 46 and the interior wall 24 of the main body 12 is caused to abut the interior wall 24 of the main body 12, thereby creating a pressure seal. It is understood that the first biasing device 34 in cooperation with the first channel 46 minimizes the need for additional devices to secure the first biasing device 34 in the first channel 46. Likewise, the second biasing device 36 is disposed in the second channel 48 of the piston 30. A radial outward force of the second biasing device 36 secures the second biasing device 36 in the second channel 48 while simultaneously exerting a force on the walls of the second channel 46. As a result, a second portion 56 of the piston 30 adjacent the second channel 48 and the inlet wall 21 of the inlet pressure chamber 22 is forced into the inlet wall 21, creating a pressure seal. It is understood that the second biasing device 36 in cooperation with the second channel 48 minimizes the need for additional devices to secure the second biasing device 36 in the second channel 48. As such, the first biasing device 34 cooperates with the first portion 54 of the piston 30 to form a pressure seal between the inner cavity 24 and the outlet pressure chamber 18, while the second biasing device 36 cooperates with the second portion 56 of the piston 30 to provide a pressure seal between the inner cavity 24 and the inlet pressure chamber 22, thereby minimizing the need for a separate sealing device or O-ring. It should be understood that the biasing devices 34, 36 isolate the inner cavity 24 from the inlet pressure chamber 22 and the outlet pressure chamber 18 to direct the fluid towards an outlet port 50 and prevent fluid from escaping into the inner cavity 24. As such, the biasing devices 34, 36 and the piston seat 32 are arranged to minimize high-pressure leaks within the pressure regulator 10 by isolating certain regions of the regulator from fluid flow. Likewise, the sealing element 25 forms a pressure seal between the main body 12 and the end cap 16, thereby maximizing pressure control in the outlet pressure chamber 18, while militating against any fluid leaks between the main body 12 and end cap 16.

During operation of the embodiment shown, the temperature of the fluid in the pressure regulator 10 varies from −80° C. and +85° C. The extreme fluctuation in temperature can generally cause seals used in the pressure regulator 10 to leak and degrade and in some instances, fail. However, in the present invention, the piston 30 is formed from a material having desirable characteristics for performance below −50° C. As such, the first portion 54 and the second portion 56 of the piston 30 cooperate with the biasing devices 34, 36 to form a pressure seal at temperatures below −50° C., thereby minimizing the need for separate sealing elements and O-rings.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A pressure regulator comprising:
a main body;
a piston having an outlet face, a longitudinal axis, and a first channel integrally formed within the piston, a wall of the first channel forming a first portion of the piston and adapted to cooperate with the main body to form a seal between the piston and the main body;
a first biasing device disposed within the first channel, the first portion of the piston disposed radially outward of the first biasing device with respect to the longitudinal axis, the first biasing device exerting a radial outward force from the longitudinal axis to secure the first biasing device in the first channel while simultaneously exerting a force on the first portion of the piston to abut an interior wall of the main body to form the seal between the piston and the main body;
an end cap coupled to the main body to enclose the piston, the end cap having an inner surface in contact with a first portion of the outlet face of the piston in an open position of the pressure regulator, the end cap further including a recess defining an outlet pressure chamber disposed radially inward of the inner surface, the first channel and the first biasing device both positioned radially outward of the recess in the open position of the pressure regulator, wherein a force caused by a pressure in the outlet pressure chamber exceeding a loading force of a loading element causes the piston to move away from the end cap exposing the inner surface of the end cap to the pressure in the outlet pressure chamber increasing a surface area of the piston exposed to the pressure in the outlet pressure chamber; and
a radial seal disposed between the end cap and the main body, the radial seal including a radial biasing element, the radial seal providing a pressure seal between the main body and the end cap.

2. The pressure regulator according to claim 1, wherein the radial biasing element is one of a spring, a metal formation having a V shape, and a tubular metal form.

3. The pressure regulator according to claim 1, wherein the radial biasing element is at least partially encased by a radial sealing material.

4. The pressure regulator according to claim 3, wherein the radial sealing material is ultra-high molecular weight polyethylene (UHMW-PE).

5. The pressure regulator according to claim 1, wherein the first biasing device does not contact an interior wall of the main body.

6. The pressure regulator according to claim 1, wherein the first channel and the first portion of the outlet face of the piston are not exposed to a first pressure in the recess in the open position of the pressure regulator.

7. The pressure regulator according to claim 1, wherein the force caused by the pressure in the outlet pressure chamber exceeding the loading force of the loading element causes the piston to move away from the end cap, further exposing the first portion of the outlet face and the first channel of the piston to the pressure in the outlet pressure chamber thereby adding a surface area of each of the first portion of the outlet face of the piston and the first channel to the surface area of the piston exposed to the pressure in the outlet pressure chamber.

8. The pressure regulator according to claim 1, wherein the piston is formed from at least one of ultra heavy molecular weight polyethylene and polytetrafluoroethylene.

9. The pressure regulator according to claim 1, wherein the piston includes at least one of a cross bore and an axial bore for directing fluid through the piston.

10. The pressure regulator according to claim 1, wherein the main body includes an inlet port configured to provide fluid communication between a pressurized fluid source and the piston.

11. The pressure regulator according to claim 1, wherein the piston is configured to receive a second biasing device for biasing a second portion of the piston to abut an interior wall of the main body to form a seal between the second portion and the main body.

12. The pressure regulator according to claim 11, wherein the piston includes a second channel integral with the piston and having a channel wall forming the second portion, the second channel configured to receive the second biasing device.

13. A pressure regulator comprising:
a main body;
a piston having an outlet face, a longitudinal axis, and a first channel integrally formed within the piston, a wall of the first channel forming a first portion of the piston and adapted to cooperate with the main body to form a seal between the piston and the main body;
a first biasing device disposed within the first channel, the first portion of the piston disposed radially outward of the first biasing device with respect to the longitudinal axis, the first biasing device exerting a radial outward force from the longitudinal axis to secure the first biasing device in the first channel while simultaneously exerting a force on the first portion of the piston to abut an interior wall of the main body to form the seal between the piston and the main body, wherein the first biasing device does not contact the interior wall of the main body;
an end cap coupled to the main body to enclose the piston, the end cap having an inner surface in contact with a first portion of the outlet face of the piston in an open position of the pressure regulator, the end cap further including a recess defining an outlet pressure chamber disposed radially inward of the inner surface, the first channel and the first biasing device both positioned radially outward of the recess in the open position of the pressure regulator such that in the open position of the pressure regulator the first channel and the first portion of the outlet face of the piston are not exposed to a pressure in the recess, wherein a force caused by a pressure in the outlet pressure chamber exceeding a loading force of a loading element causes the piston to move away from the end cap further exposing the inner surface of the end cap in addition to the first portion of the outlet face and the first channel of the piston to the pressure in the outlet pressure chamber thereby adding a surface area of each of the first portion of the outlet face of the piston and the first channel to a surface area of the piston exposed to the pressure in the outlet pressure chamber; and a radial seal disposed between the end cap and the main body, the radial seal including a radial biasing element, the radial seal providing a pressure seal between the main body and the end cap.

14. The pressure regulator according to claim 13, wherein the radial biasing element is one of a spring, a metal formation having a V shape, and a tubular metal form.

15. The pressure regulator according to claim 13, wherein the radial biasing element is at least partially encased by a radial sealing material.

16. The pressure regulator according to claim 15, wherein the radial sealing material is UHMW-PE.

17. The pressure regulator according to claim 13, wherein the piston includes a second channel formed adjacent a second portion of the piston, the second channel configured to receive a second biasing device for biasing the second portion to form a seal between the second portion and the main body.

18. A pressure regulator comprising:
a main body including an inner cavity bounded by an interior wall;
a piston disposed in the inner cavity, the piston including an outlet face, a longitudinal axis, and a first channel integral with the piston and having a channel wall forming a first portion, the first portion abutting the interior wall of the inner cavity of the main body, wherein the first portion is adapted to cooperate with the interior wall to form a seal between the piston and the interior wall;
a first biasing device disposed in the first channel, the first portion of the piston disposed radially outward of the first biasing device with respect to the longitudinal axis, wherein the first biasing device exerts a radial outward force from the longitudinal axis to secure the first biasing device in the first channel while simultaneously exerting a force on the first portion of the piston to form the seal between the piston and the interior wall and the first biasing device does not contact the interior wall;
an end cap coupled to the main body thereby enclosing the piston to form an outlet pressure chamber, the end cap having an inner surface in contact with a first portion of the outlet face of the piston in an open position of the pressure regulator, the end cap further including a recess defining the outlet pressure chamber disposed radially inward of the inner surface, the first channel and the first biasing device both positioned radially outward of the recess in the open position of the pressure regulator such that in the open position of the pressure regulator the first channel and the first portion of the outlet face of the piston are not exposed to a pressure in the recess, wherein a force caused by a pressure in the outlet pressure chamber exceeding a loading force of a loading element causes the piston to move away from the end cap further exposing the inner surface of the end cap in addition to the first portion of the outlet face and the first channel of the piston to the pressure in the outlet pressure chamber thereby adding a surface area of each of the first portion of the outlet face of the piston and the first channel to a surface area of the piston exposed to the pressure in the outlet pressure chamber; and
a radial seal disposed between the end cap and the main body, the radial seal including a radial biasing element, the radial seal providing a pressure seal between the main body and the end cap.

19. The pressure regulator according to claim 18, wherein the radial biasing element is one of a spring, a metal formation having a V shape, and a tubular metal form.

20. The pressure regulator according to claim 18, wherein the radial biasing element is at least partially encased by a radial sealing material.

* * * * *